US010137850B2

(12) United States Patent
Frederick

(10) Patent No.: US 10,137,850 B2
(45) Date of Patent: Nov. 27, 2018

(54) VEHICLE BUMPER COLLISION INDICATOR

(71) Applicant: Toyota Motor Engineering & Manufacturing North America, Inc., Erlanger, KY (US)

(72) Inventor: Scott L. Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 24 days.

(21) Appl. No.: 15/430,302

(22) Filed: Feb. 10, 2017

(65) Prior Publication Data

US 2018/0194309 A1    Jul. 12, 2018

Related U.S. Application Data

(60) Provisional application No. 62/444,977, filed on Jan. 11, 2017.

(51) Int. Cl.
*B60R 19/44* (2006.01)
*B60R 19/18* (2006.01)

(52) U.S. Cl.
CPC ...... *B60R 19/18* (2013.01); *B60R 2019/1886* (2013.01)

(58) Field of Classification Search
CPC ... B60R 21/0136; B60R 19/483; B60R 19/34; B60R 21/34; B60R 19/18; B60R 19/023; B62D 21/152
USPC .................. 293/142; 180/271, 274; 340/436; 280/735
See application file for complete search history.

(56) References Cited

U.S. PATENT DOCUMENTS

| | | | | |
|---|---|---|---|---|
| 2,646,016 A | * | 7/1953 | Loyal | B60Q 1/52 116/32 |
| 3,794,136 A | * | 2/1974 | Okada | B60R 21/0136 180/274 |
| 3,830,329 A | * | 8/1974 | Sumida | B60R 19/32 180/274 |
| 4,023,056 A | * | 5/1977 | Yamada | B60R 21/0136 280/735 |
| 4,225,167 A | | 9/1980 | Buettner et al. | |
| 4,399,887 A | * | 8/1983 | Okada | B60R 21/0136 180/282 |

(Continued)

*Primary Examiner* — Kiran B Patel
(74) *Attorney, Agent, or Firm* — Christopher G. Darrow; Darrow Mustafa PC

(57) ABSTRACT

An energy absorption system for a vehicle is provided with a collision indicator to indicate whether the structural integrity of an energy absorber has been compromised after an impact. The system may be a vehicle bumper system, such as a rear bumper of a pick-up truck, and can include an inner reinforcement member configured to be secured to a structural component or frame of the vehicle. At least one collision indicator is provided, integrated with the inner reinforcement member. The collision indicator includes a sacrificial portion having a size and shape tuned to break upon being subjected to a predetermined stress threshold. The system may be provided with an outer cover member, or bumper fascia, at least a portion of which may be removable to enable a visual inspection of the collision indicator after an impact. A broken sacrificial portion may indicate the need to replace a failed component.

13 Claims, 5 Drawing Sheets

(56) References Cited

U.S. PATENT DOCUMENTS

| | | | | |
|---|---|---|---|---|
| 6,607,212 B1* | 8/2003 | Reimer | ............... | B60R 21/0136 180/274 |
| 6,948,750 B2* | 9/2005 | Federspiel | .......... | B60R 21/0136 280/735 |
| 7,137,472 B2* | 11/2006 | Aoki | ................ | B60R 21/0136 180/274 |
| 7,364,222 B2* | 4/2008 | Tanabe | ................ | B60R 21/0136 293/4 |
| 7,631,565 B2* | 12/2009 | Tanabe | ................ | B60R 21/0136 180/274 |
| 7,637,545 B2* | 12/2009 | Takahashi | ............ | B60R 19/483 293/132 |
| 7,737,833 B2* | 6/2010 | Takafuji | .............. | B60R 21/0132 180/274 |
| 7,782,180 B2* | 8/2010 | Takafuji | .............. | B60R 21/0136 340/425.5 |
| 7,804,414 B2* | 9/2010 | Kiribayashi | ........ | B60R 21/0136 180/274 |
| 7,828,350 B2* | 11/2010 | Kiribayashi | ........ | B60R 21/0136 293/117 |
| 7,854,453 B2* | 12/2010 | Tanabe | ................ | B60R 21/0136 293/102 |
| 7,868,748 B2* | 1/2011 | Kiribayashi | .......... | B60R 19/483 180/274 |
| 7,911,331 B2* | 3/2011 | Tanabe | ................ | B60R 21/0136 180/274 |
| 7,952,469 B2* | 5/2011 | Suzuki | ................ | B60R 21/0136 340/435 |
| 8,128,140 B2* | 3/2012 | Tanabe | ................ | B60R 21/0136 293/117 |
| 8,157,046 B2* | 4/2012 | Tanabe | ................ | B60R 21/0136 180/274 |
| 8,321,092 B2* | 11/2012 | Browne | ................ | B60R 21/013 701/117 |
| 8,350,685 B2* | 1/2013 | Tanabe | ................ | B60R 21/0136 180/274 |
| 8,368,523 B2* | 2/2013 | Takahashi | ........... | B60R 21/0136 180/274 |
| 8,428,862 B2* | 4/2013 | Mase | ..................... | B60R 19/18 180/271 |
| 8,473,188 B2* | 6/2013 | Tanabe | ................ | B60R 21/0136 180/274 |
| 8,653,958 B2* | 2/2014 | Tanabe | ................... | B60R 19/20 293/132 |
| 8,744,743 B2* | 6/2014 | Kawasaki | ............ | B60R 19/483 180/68.1 |
| 8,864,196 B2* | 10/2014 | Shamoto | ................ | B60R 19/18 293/107 |
| 8,936,285 B2* | 1/2015 | Inoue | ..................... | B60R 19/18 293/102 |
| 8,939,249 B2 | 1/2015 | Kuhr et al. | | |
| 8,942,891 B2* | 1/2015 | Watanabe | ........... | B60R 21/0136 701/45 |
| 9,114,767 B2* | 8/2015 | Jeong | ..................... | B60R 19/18 |
| 9,352,715 B2* | 5/2016 | Narita | ..................... | B60R 19/18 |
| 9,610,913 B2* | 4/2017 | Narita | ..................... | B60R 19/483 |
| 9,663,053 B2* | 5/2017 | Saitoh | ..................... | B60R 19/18 |
| 9,688,226 B2* | 6/2017 | Suzumori | ............. | B60R 19/023 |
| 2002/0039064 A1* | 4/2002 | Yamada | ................... | B60R 1/12 340/435 |
| 2006/0192697 A1* | 8/2006 | Quick | .................. | H04L 1/0041 341/60 |

* cited by examiner

VEHICLE BUMPER COLLISION INDICATOR

CROSS-REFERENCE TO RELATED APPLICATION

This application claims the benefit of U.S. Provisional Application No. 62/444,977, filed Jan. 11, 2017, which is incorporated by reference in its entirety.

TECHNICAL FIELD

The present disclosure generally relates to energy absorbing devices for vehicles and, more particularly, to the use of an indicator to detect whether a vehicle collision results in a compromise of structural integrity of an energy absorbing device or the like, such as a bumper.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

SUVs, pick-up trucks, and similar vehicles may sometimes be used in an aggressive manner. For example, users of pick-up trucks are known to stand on a rear bumper assembly in order to load, unload, or otherwise gain access into a truck bed portion. Thus, rear bumper assemblies should be designed not only to serve as energy absorbing devices during a collision or impact with another object or vehicle, commonly involving forces exerted in a substantially horizontal direction, but should also be designed to withstand the downward forces exerted when a user places a weight or load on at least a portion of the bumper assembly.

Current technology bumper covers, or bumper fascia, often revert back to their original shape after an impact. Accordingly, a visual inspection of the bumper fascia and exterior of a bumper assembly after a collision, or other impact, may not properly expose or otherwise indicate a compromise of the structural integrity of components. Subsequent standing on a compromised bumper assembly, or other application of a downward load or force similar to a user standing on the bumper, could result in the bumper assembly not being able to meet the load requirements.

Accordingly, there remains a need for an improved assembly and methods for detecting when structural components of energy absorbing devices and/or reinforcing components are compromised.

SUMMARY

This section provides a general summary of the disclosure, and is not a comprehensive disclosure of its full scope or all of its features.

In various aspects, the present teachings provide an energy absorption system for a vehicle. The energy absorption system may include an energy absorber configured to be secured to a structural component of the vehicle. A collision indicator may be provided, integrated with the energy absorber component. The collision indicator may include at least one sacrificial portion having a shape and size tuned to break upon being subjected to a predetermined stress threshold that indicates a compromise in structural integrity of the energy absorber. More than one collision indicator may be provided. In certain aspects, the system may include a first collision indicator with a sacrificial portion tuned to a first predetermined stress threshold, and a second collision indicator with a sacrificial portion tuned to a second predetermined threshold that is different from the first predetermined stress threshold.

In other aspects, the present teachings provide a vehicle bumper system for detecting a breach in structural integrity after receiving an impact. The rear bumper system may include an inner reinforcement member configured to be secured to a frame of the vehicle. At least one collision indicator is provided, integrated with the inner reinforcement member. The collision indicator may include a sacrificial portion having a size and shape tuned to break upon being subjected to a predetermined stress threshold. A removable outer cover member may be provided, allowing a visual inspection of the collision indicator. In various aspects, the collision indicator may be integrally formed as part of the inner reinforcement member, and made of the same material. In other aspects, the collision indicator may be a modular unit attached to the inner reinforcement member. The modular unit may include a main body and a pin-shaped sacrificial portion configured to break after the inner reinforcement member is subjected to an impact exhibiting a force exceeding the predetermined stress threshold of the bumper system.

In still other aspects, the present teachings provide a method for determining a compromise in structural integrity of an energy absorption system of a vehicle. The method includes obtaining a vehicle subjected to an impact. At least a portion of an outer cover member of the energy absorption system is removed to reveal an energy absorber secured to a structural component of the vehicle. The method includes locating at least one collision indicator integrated with the energy absorber. The collision indicator comprises at least one sacrificial portion having a shape and size tuned to break upon being subjected to a predetermined stress threshold. The method includes inspecting the sacrificial portion of the collision indicator to determine whether there is a break indicating a compromise in structural integrity of the energy absorber. In certain aspects, the energy absorption system includes a plurality of collision indicators tuned to break upon being subjected to forces applied in a respective plurality of different directions. The step of inspecting the sacrificial portion of the collision indicators may include determining a direction of the force that caused the compromise in structural integrity.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the devices and methods among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally relates to an energy absorption system for a vehicle that is provided with a collision indicator configured to indicate whether the structural integrity of an energy absorber has been compromised after an impact, such as a collision with another vehicle or object. In various aspects, the energy absorption system may be a vehicle bumper system, such as a rear bumper of a pick-up truck or SUV. The energy absorber can include an inner reinforcement member configured to be secured to a structural component of the vehicle, such as a vehicle frame, frame rail, or portion thereof. While various specific uses described herein relate to a vehicle bumper assembly, it should be understood that the present technology can also be used with other energy absorbing assemblies used in vehicles, including door assemblies, fender assemblies, and any other portion of a vehicle that may need to be designed to provide energy absorbing properties. At least one collision indicator is provided, integrated with the inner reinforcement member. The collision indicator may include a sacrificial portion having a size and shape that may be specifically tuned to break upon being subjected to a predetermined stress threshold. The energy absorption system may be provided with an outer cover member, such as a bumper fascia, at least a portion of which may be removable to enable a visual inspection of the collision indicator after an impact. A broken sacrificial portion may confirm that a vehicle collision occurred, and in certain aspects, may also indicate the need to replace one or more components of the energy absorption/bumper system. The location of the collision indicators, as well as the properties of the sacrificial portions may further assist technicians to understand the root cause of an energy absorber being compromised after an impact. For example, to determine whether the compromise in integrity was caused by a user stepping on it, or additionally/alternatively the vehicle was involved in a collision such as a rear impact.

Figure 1:
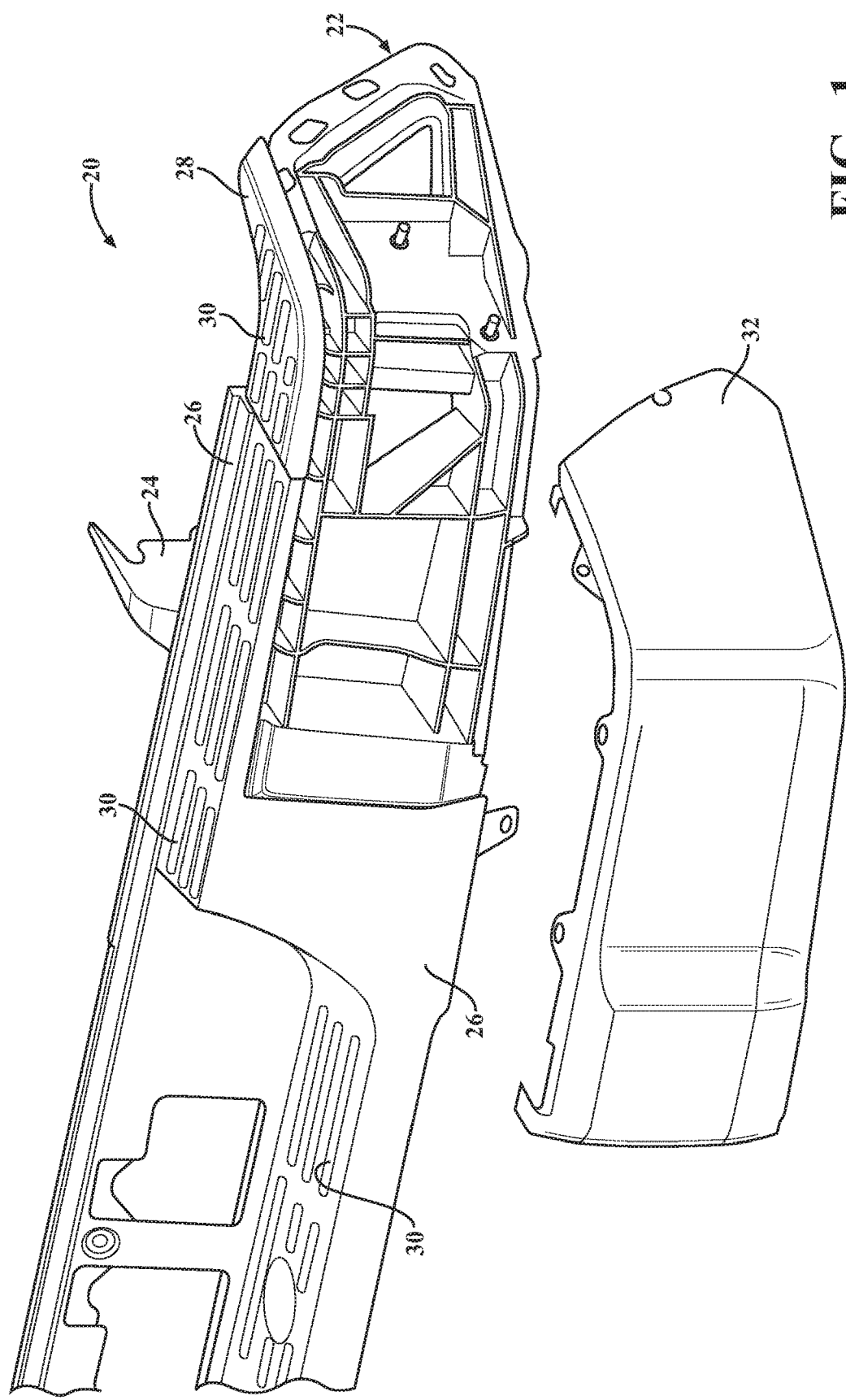
FIG. 1 is a partially exploded perspective view of an exemplary vehicle bumper assembly with a removable outer cover member.

With reference to the drawings, FIG. 1 illustrates a partially exploded perspective view of an exemplary vehicle bumper assembly 20. The particular assembly 20 as shown in FIG. 1 may be particularly useful with a pick-up truck or SUV, although it is envisioned that the present technology may be used with various different types of vehicles. The assembly 20 may include at least one inner reinforcement member 22 operable to function as an energy absorber component, specifically designed and provided with sufficient strength and rigidity to accept loads and forces from various different directions. The inner reinforcement member 22 may be configured to be secured, using known fastening techniques, to a structural component of the vehicle, such as a portion of the vehicle frame 24 or frame rails.

The vehicle bumper assembly 20 may include various fascia, such as outer cover members/portions. The fascia is generally formed from a thermoplastic material and may include vehicle painting or coatings. The fascia may be shaped and sized to substantially hide the inner reinforcement member 22 as well as any other structural/reinforcing component from view. As shown, the assembly 20 may include a central outer cover portion 26 and respective end portions 28 coupled to the inner reinforcement member 22. The outer portions 26, 28 may be designed to transfer, dissipate, or otherwise withstand the various forces and loads that may be exerted thereon, for example, the downward or substantially vertical forces of a user standing on the bumper to access a truck bed portion of the vehicle. Optional protrusions 30, ribs, textures, or the like may be provided on the outer surfaces. At least a portion of the outer cover member, designated by reference number 32, may be configured to be removable in order to permit a visual inspection of at least a portion of the inner reinforcement member 22.

Figure 2:
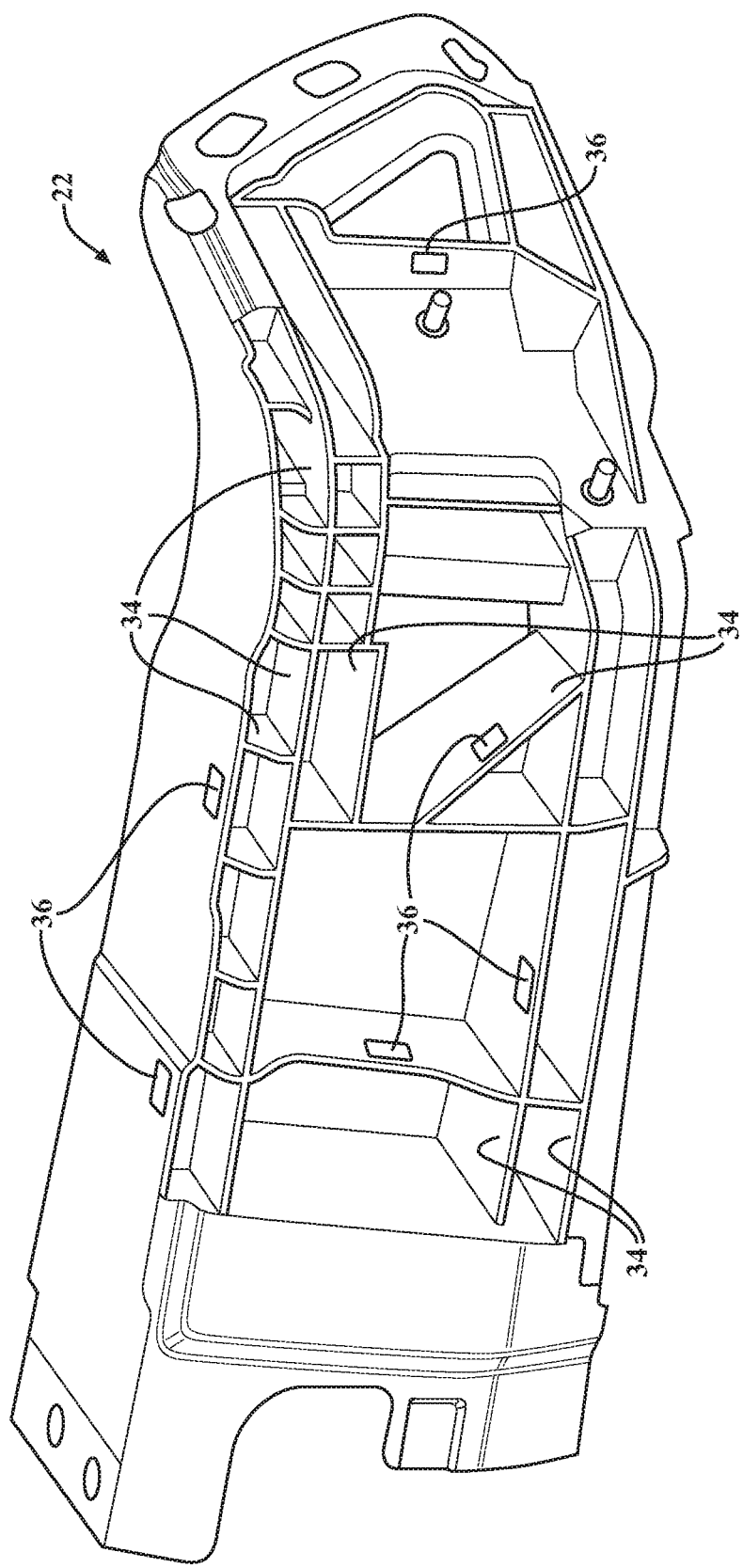
FIG. 2 is a perspective view providing additional details of an inner reinforcement member of the vehicle bumper assembly of FIG. 1 according to various aspects of the present disclosure.

FIG. 2 is a perspective view providing additional details of an exemplary inner reinforcement member 22 of the vehicle bumper assembly of FIG. 1 according to various aspects of the present disclosure. In various aspects, the inner reinforcement member 22 may be fabricated using known injection molding techniques. By way of non-limiting example, the inner reinforcement member 22 may be made of a resin having a suitable strength, such as a thermoplastic resin. The inner reinforcement member 22 may be formed with various walls 34 and internal webbing such that it is tuned to properly receive certain high speed/low speed and pedestrian/barrier impacts commensurate with applicable guidelines or regulations. As is known in the art, certain of the walls may be load bearing, and other walls, webs, or portions thereof, may be designed as crush areas, boxes, or lobes configured to deform or collapse in a predetermined manner upon receiving a load or impact. When an impact or load bearing event has ended, the inner reinforcement member 22 may return to its original shape and retain integrity to withstand subsequent impacts—unless the impact event was of a force sufficient to compromise the structural integrity.

The inner reinforcement member 22 of the present technology is integrated with at least one collision indicator 36. FIG. 2 illustrates a plurality of collision indicators 36. In one example, the inner reinforcement member may include a plurality of inner walls 34, and the collision indictor 36 is disposed adjacent an outer edge 35 of one of the plurality of walls 34. As discussed in more detail below, the collision indicator 36 generally includes at least one sacrificial portion 38 provided having a size and shape that is tuned to break or shear upon being subjected to a predetermined stress threshold. The sacrificial portion 38 may be substantially aligned with the outer edge 35 of the wall 34. In various aspects, the predetermined stress threshold is equivalent to a predetermined force required to compromise a structural integrity of the inner reinforcement member 22, for example, rendering the inner reinforcement member 22 incapable of absorbing a desired amount of force. The inner reinforcement member 22, as shown in FIG. 2, may be provided with a plurality of collision indicators 36 at different locations. As non-limiting examples, certain collision indicators 36 (and corresponding sacrificial portions 38) may be spaced apart and located in different planes, and they may be aligned vertically, horizontally, or at a desired angle commensurate with the respective wall 34 or webbing.

In various aspects, each of the plurality of collision indicators 36 may be separately tuned to break upon being subjected to force(s) applied in a respective plurality of different directions. This may ultimately enable one to identify a direction of the force that caused the compromise in structural integrity. In one example, a first collision indicator 36 may be provided with a sacrificial portion 38 tuned to a first predetermined stress threshold, and a second collision indicator 36 may be provided with a sacrificial portion 38 tuned to a second predetermined threshold that is different from the first predetermined stress threshold. In addition to being tuned to different impact thresholds, the various collision indicators 36 may be tuned based on directional vectors representative of the forces.

Figure 3:
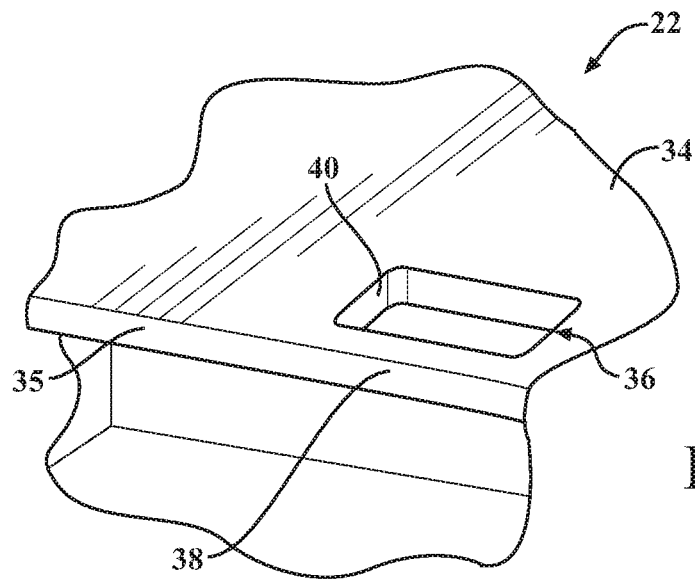
FIG. 3 is a magnified perspective view of a portion of the inner reinforcement member of FIG. 2, illustrating a collision indicator integrally formed with the inner reinforcement member according to a first aspect of the present disclosure.

FIG. 3 is a magnified perspective view of a portion of the inner reinforcement member 22 of FIG. 2, illustrating a collision indicator 36 integrally formed with the inner reinforcement member 22 according to a first aspect of the present disclosure. It is envisioned that the collision indicator 36 can be formed by defining an aperture 40 using the injection molding techniques. Alternatively, the aperture 40 can be defined using a stamping technique, or equivalent. The aperture 40 may be sized and shaped to form a sacrificial portion 38 having a desired strength. The size and shape of the sacrificial portion 38 may be dictated by the material selection, as well as the amount of predetermined force desired to effect a break or shear of the sacrificial portion 38. In this aspect, the sacrificial portion 38 comprises the same material as the inner reinforcement member 22. The overall geometry of the sacrificial portion 38, including the length and width (or diameter) will influence the predetermined force necessary to result in a break or shear. The cross-section along the length of the sacrificial portion 38 may be substantially uniform. In other aspects, the sacrificial portion 38 may be modified or provided with certain localized notches, cut-outs, grooves, or the like (not shown), in order to alter the predetermined force required to cause a break or shear.

Figure 4:
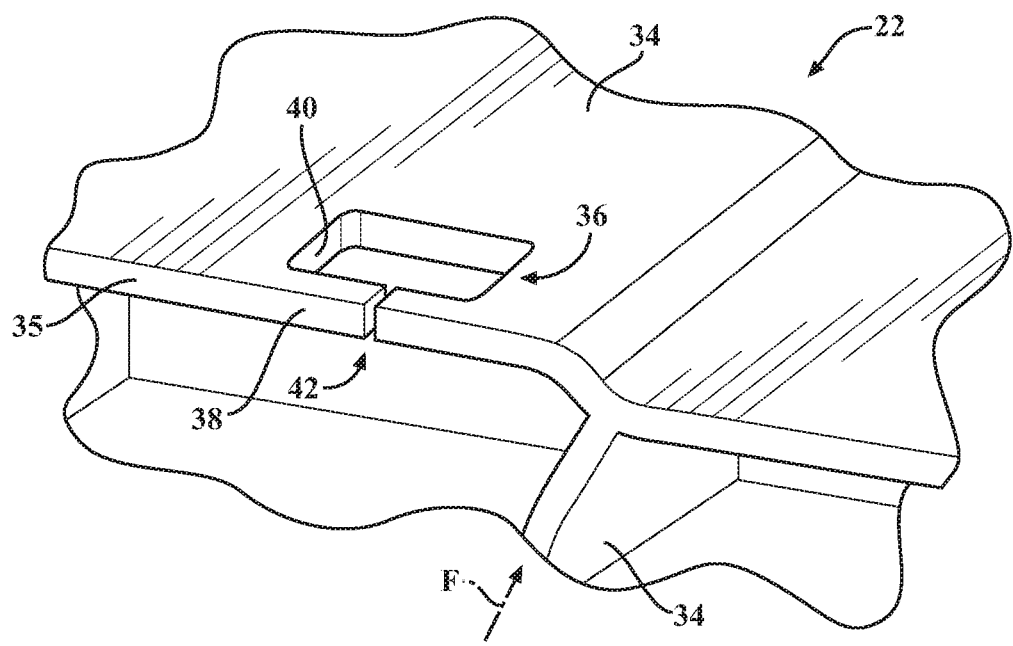
FIG. 4 is a magnified perspective view of a portion of the inner reinforcement member as shown in FIG. 3, illustrating a break in a sacrificial portion of the collision indicator after the vehicle bumper assembly receives an impact.

FIG. 4 is a magnified perspective view of a portion of the inner reinforcement member 33 as shown in FIG. 3, illustrating a break 42 in a sacrificial portion 38 of the collision indicator after the vehicle bumper assembly receives an impact represented by the arrow "F." The sacrificial portion 38 is preferably tuned such that the break 42 or shear is clearly visible by the naked eye. In certain aspects, the break may not completely sever the sacrificial portion 38 in half, but should otherwise result in a noticeable deformation.

Figure 5:
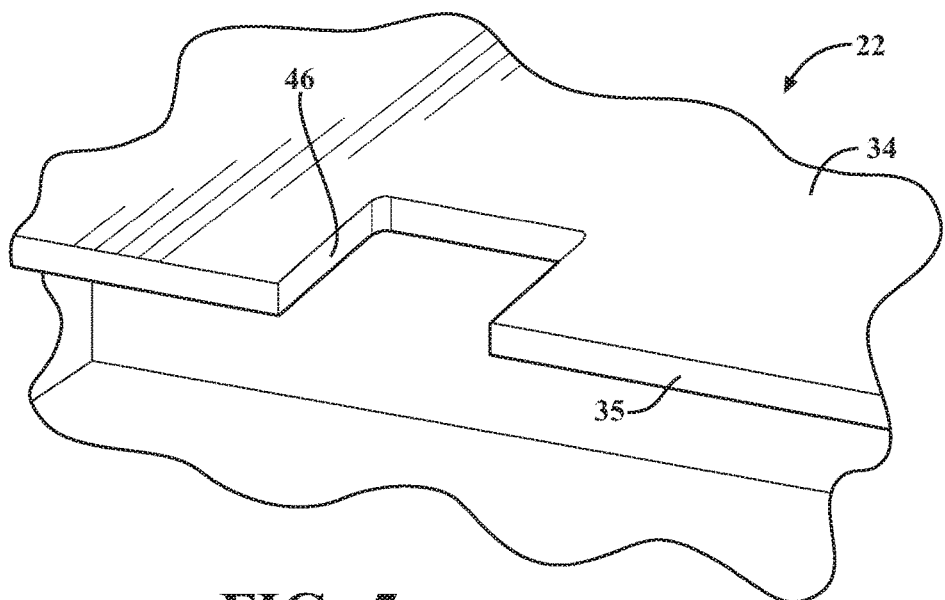
FIG. 5 is a magnified perspective view of a portion of the inner reinforcement member of FIG. 2, illustrating an aperture for receiving a modular unit collision indicator according to a second aspect of the present disclosure.

With reference to FIGS. 5-9, the present technology also provides aspects where the collision indicator is provided as a separate module, or modular unit 44, that is integrated with the inner reinforcement member 22 by being attached thereto. Although the specific connection/attachment mechanisms are not shown, it should be understood that the modular unit 44 may be mechanically secured to the inner reinforcement member 22 with a suitable fastener, coupled using a suitable adhesive, or formed with respective tongue and groove type features for enabling a slidable connection. FIG. 5 is a magnified perspective view of a portion of the inner reinforcement member 22 of FIG. 2, illustrating an aperture 46 defined therein for receiving a modular unit 44 type of collision indicator according to a second aspect of the present disclosure.

Figure 6:
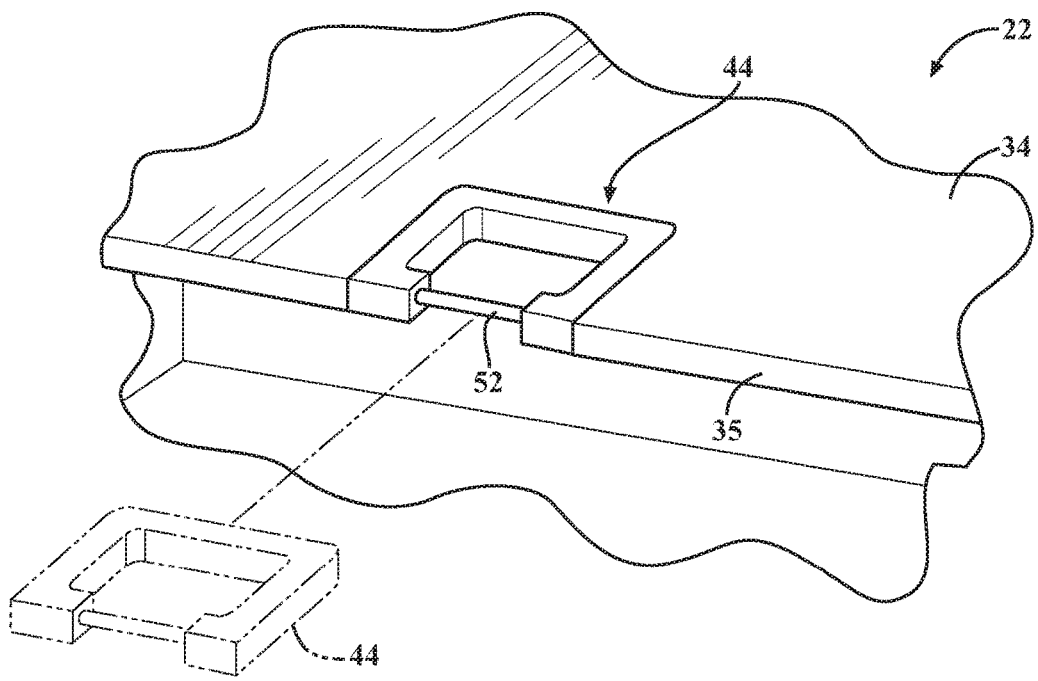
FIG. 6 is a magnified perspective view of a portion of the inner reinforcement member as shown in FIG. 5, receiving the modular unit.
Figure 7:
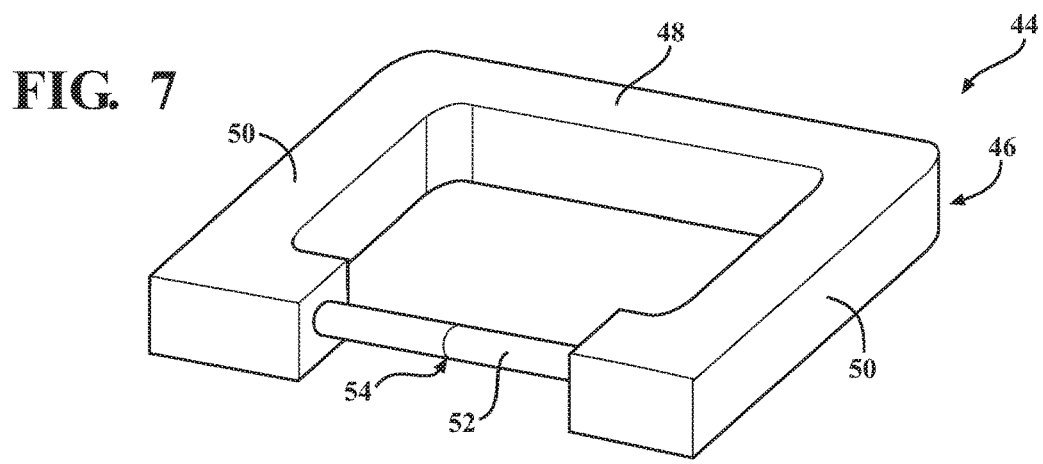
FIG. 7 illustrates details of an exemplary modular unit collision indicator.

FIG. 6 is a magnified perspective view of a portion of the inner reinforcement member 22 as shown in FIG. 5, receiving the modular unit 44. FIG. 7 illustrates details of an exemplary modular unit 44 collision indicator. The modular unit 44 may include a main body 46, which is shown having a substantially C-shaped profile with a base portion 48 and two extending side arm portions 50. The side arms portions 50 may be coupled to a sacrificial portion 52. The modular unit 44 may be aligned with an edge 35 of the wall 34. As shown, the sacrificial portion 52 is a cylindrically extending member, i.e. pin-shaped, having a substantially uniform diameter. Optionally, at least one annular groove 54, or the like, may be defined in the sacrificial portion 52 to alter the predetermined force required to cause a break or shear. Once tuned, it is envisioned that the pin-shaped sacrificial portion 52 can remain ready for operation for an indefinite period of time.

Figure 8:
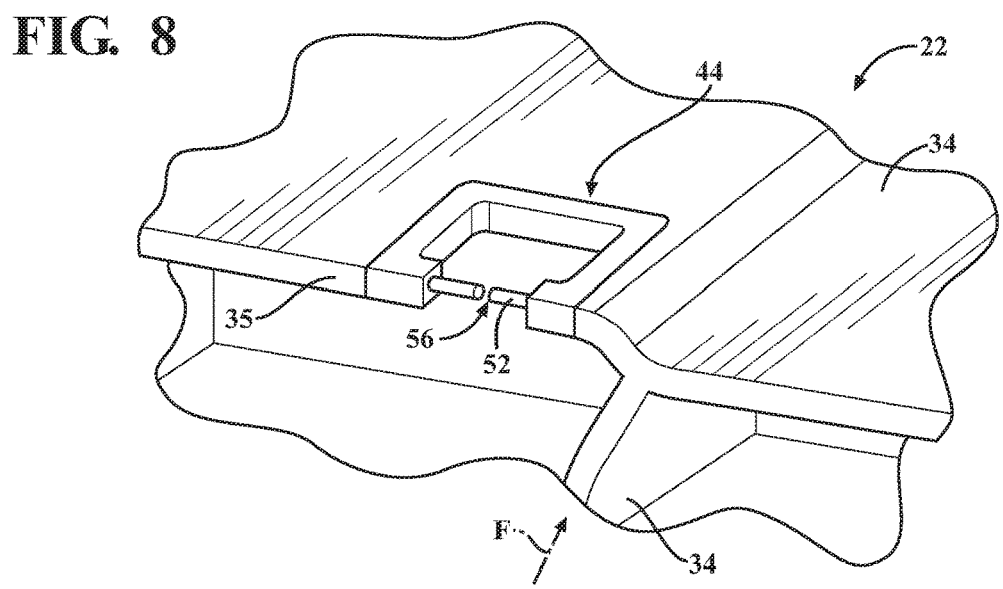
FIG. 8 is a magnified perspective view of a portion of the inner reinforcement member as shown in FIG. 6, illustrating a break in a sacrificial portion of the modular unit collision indicator after the vehicle bumper assembly receives an impact.

FIG. 8 is a magnified perspective view of a portion of the inner reinforcement member as shown in FIG. 6, illustrating a break 56 in the sacrificial portion 52 of the modular unit 44 collision indicator after the vehicle bumper assembly receives an impact represented by the arrow labeled "F." The sacrificial portion 52 is preferably tuned such that the break 56 or shear is clearly visible by the naked eye. In certain aspects, the break may not completely sever the sacrificial portion 52 in half, but should otherwise result in a noticeable deformation.

Figure 9:
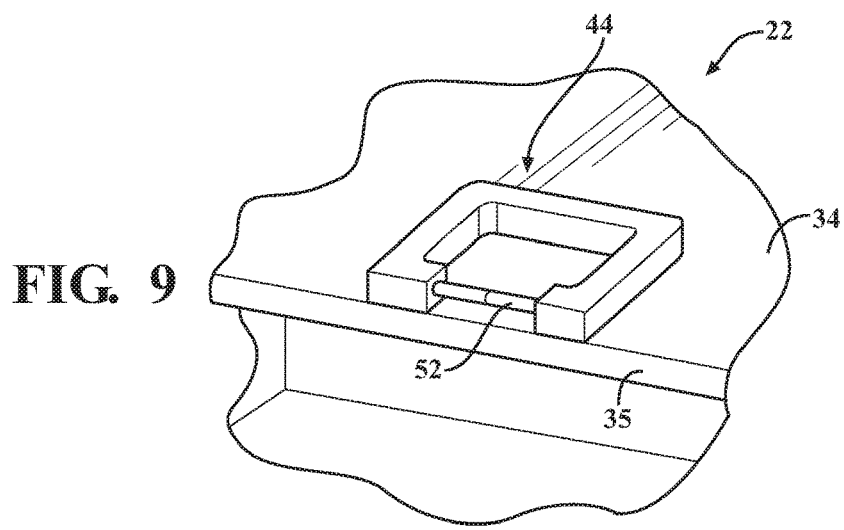
FIG. 9 is a magnified perspective view of a portion of the inner reinforcement member as shown in FIG. 2, illustrating a modular unit collision indicator attached thereto.

In still other aspects, it is envisioned that a modular unit 44 can also be used for certain after-market uses where it is desirable to monitor forces sustained by certain components. FIG. 9 is a magnified perspective view of a portion of the inner reinforcement member 22 as shown in FIG. 2, illustrating a modular unit 44 collision indicator attached to a surface of one wall 34. As shown, the modular unit 44 may be aligned with an edge 35 of the wall 34. Due to the nature of the design, it should be understood that, for after-market uses, the sacrificial portion 52 may need to be tuned to a different degree as compared to the other embodiments disclosed herein.

In still further aspects, the present teachings also provide methods for determining a compromise in structural integrity of an energy absorption system of a vehicle. The methods may be particularly useful wherein the energy absorption system is a rear bumper assembly of a pick-up truck, configured to withstand forces applied in a vertical direction. One exemplary method begins with obtaining a vehicle subjected to an impact. At least a portion of an outer cover member 32 of the energy absorption system 20 is removed to reveal an energy absorber 22 secured to a structural component, or frame 24, of the vehicle. Once the energy absorber 22 is at least partially exposed, the method includes locating at least one collision indicator 36 integrated with the energy absorber 22. As discussed above, the collision indicator 36 includes at least one sacrificial portion 38, 52 having a shape and size tuned to break upon being subjected to a predetermined stress threshold. The method includes inspecting the sacrificial portion 38, 52 of the collision indicator 36 to determine whether there is a break 42, 56 indicating a compromise in structural integrity of the energy absorber 22. In certain aspects, the energy absorption system 20 includes a plurality of collision indicators 36 tuned to break upon being subjected to forces applied in a respective plurality of different directions. The location of the collision indicators, as well as the properties of the sacrificial portions may further assist technicians to understand the root cause of an energy absorber being compromised after an impact. For example, to determine whether the compromise in integrity was caused by a user stepping on it, applying an excessive vertical load, or additionally/alternatively to determine that the vehicle was involved in a collision such as a rear impact. Thus, the step of inspecting the sacrificial portion 38, 52 of the collision indicators may include determining a direction of the force that caused the compromise in structural integrity. Once the direction of the force is determined, it may be possible to verify whether the compromise in structural integrity was due to an impact, such as a rear-end collision with another vehicle or object, of if the compromise was due to a load applied in a vertical direction. In various aspects, such a distinction may influence certain liabilities and/or warranties with respect to the need to replace one or more components of the energy absorption/bumper system.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the term "vehicle" should be construed having a broad meaning, and should include all types of vehicles, with non-limiting examples including a passenger car, truck, motorcycle, off-road vehicle, bus, boat, airplane, helicopter, lawn mower, recreational vehicle, amusement park vehicle, farm vehicle, construction vehicle, tram, golf cart, train, or trolley, etc. The vehicles may be self-driving, for example, having an autonomous mode, and/or be manually operated.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A vehicle bumper system for detecting a compromise in structural integrity after receiving an impact, the vehicle bumper system comprising:
   an inner reinforcement member configured to be secured to a frame of a vehicle;
   a collision indicator integrated with the inner reinforcement member, the collision indicator comprising a sacrificial portion having a size and shape tuned to break upon being subjected to a predetermined stress threshold; and
   a removable outer cover member.

2. The vehicle bumper system according to claim 1, wherein the collision indicator is integrally formed as part of the inner reinforcement member.

3. The vehicle bumper system according to claim 1, wherein the collision indicator is a modular unit attached to the inner reinforcement member.

4. The vehicle bumper system according to claim 3, wherein the modular unit comprises a main body and a pin-shaped sacrificial portion configured to break upon the vehicle being subjected to an impact exhibiting a force exceeding the predetermined stress threshold.

5. The vehicle bumper system according to claim 4, wherein the main body comprises a substantially C-shaped profile including a base portion and two extending arms coupled to the pin-shaped sacrificial portion.

6. The vehicle bumper system according to claim 4, wherein the pin-shaped sacrificial portion defines a uniform diameter with at least one annular groove defined therein.

7. The vehicle bumper system according to claim 3, wherein the inner reinforcement member defines an aperture configured to accept the collision indicator.

8. The vehicle bumper system according to claim 1, comprising a plurality of collision indicators integrated with the inner reinforcement member in different locations.

9. The vehicle bumper system according to claim 8, wherein at least two of the plurality of collision indicators are located in a different planes.

10. The vehicle bumper system according to claim 8, wherein the plurality of collision indicators are tuned to break upon being subjected to forces applied in a respective plurality of different directions in order to identify a direction of the force that caused the compromise in structural integrity.

11. The vehicle bumper system according to claim 1, comprising a first collision indicator with a sacrificial portion tuned to a first predetermined stress threshold, and a second collision indicator with a sacrificial portion tuned to a second predetermined threshold that is different from the first predetermined stress threshold.

12. The vehicle bumper system according to claim 1, wherein the inner reinforcement member and the sacrificial portion of the collision indicator comprise the same material.

13. The vehicle bumper system according to claim 1, wherein the inner reinforcement member comprises a plurality of walls, and the collision indicator is disposed adjacent an outer edge of one of the plurality of walls.

* * * * *